June 29, 1943.  W. H. MOHR  2,322,869
THIMBLE
Filed Feb. 16, 1943
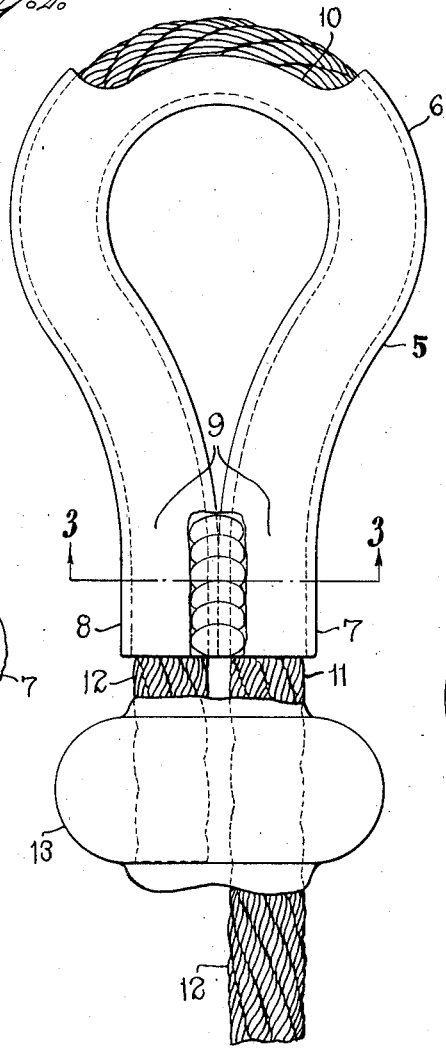
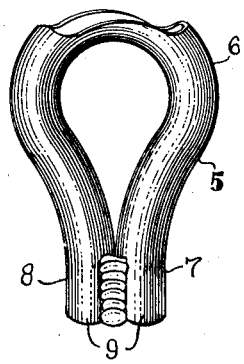
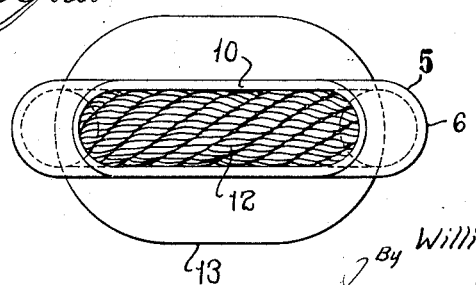
Inventor
William H. Mohr
By Seymour Earle Nichols
Attorneys Patented June 29, 1943

2,322,869

UNITED STATES PATENT OFFICE 2,322,869

THIMBLE

William H. Mohr, Newport, R. I.

Application February 16, 1943, Serial No. 476,115

3 Claims. (Cl. 114—115)

This invention relates to an improvement in thimbles for forming a loop in cables and especially wire cables.

The object of the invention is to provide a thimble through which one end of a cable may be readily passed to form an eye which will withstand any strain placed upon it, and the invention consists in the construction as hereinafter described and particularly recited in the claims.

In the accompanying drawing:

Fig. 1 is a front view of a thimble embodying my invention and applied to a cable;

Fig. 2 is a top view of the same;

Fig. 3 is a sectional view on the line 3—3 of Fig. 1; and

Fig. 4 is a perspective view of the thimble, detached.

In carrying out my invention, I employ a piece of tubing 5 of suitable metal bent to form an eye 6 and straight ends 7 and 8, which ends are side by side and secured together by welding or other suitable means to form a stem 9.

At the outer end of the eye 6, the tubing is cut away to form a slot 10, the width of which is about equal to the diameter of the tube 5.

One end 11 of a cable 12 is entered into one end of the tube herein shown at 7, and pushed through the tube and out of the other end 8 of the tube, and coupled to the adjacent portion of the cable by a block 13 of solder, or otherwise prevented from being withdrawn. The slot 10 forms an opening through which the end of the cable may be withdrawn, if desired, to facilitate passing the cable through the tube.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A thimble comprising a single piece of tubing bent to form an eye, the ends of the tube being secured together forming a stem.

2. A thimble comprising a single piece of tubing bent to form an eye, the ends of the tube being welded together forming a stem.

3. A thimble comprising a single piece of tubing bent to form an eye, the ends of the tube being secured together forming a stem, the outer end of the eye cut away forming a clearance opening.

WILLIAM H. MOHR.